United States Patent [19]
Trocciola et al.

[11] Patent Number: 5,330,727
[45] Date of Patent: Jul. 19, 1994

[54] APPARATUS FOR REMOVING CARBON MONOXIDE FROM GASEOUS MEDIA

[75] Inventors: John C. Trocciola; Craig R. Schroll, both of Glastonbury; Roger R. Lesieur, Enfield, all of Conn.

[73] Assignee: International Fuel Cells Corporation, South Windsor, Conn.

[21] Appl. No.: 995,845

[22] Filed: Dec. 23, 1992

Related U.S. Application Data

[62] Division of Ser. No. 853,663, Mar. 19, 1992.

[51] Int. Cl.$^5$ .............................................. B01D 53/04
[52] U.S. Cl. ................................. 422/177; 422/171; 422/173; 423/247
[58] Field of Search ................ 423/247; 422/171, 173, 422/177

[56] References Cited

U.S. PATENT DOCUMENTS

| | | | |
|---|---|---|---|
| 3,672,824 | 6/1972 | Tamura et al. | 423/247 |
| 4,135,885 | 1/1979 | Wormser et al. | 422/173 |
| 5,108,714 | 4/1992 | Iwata et al. | 422/173 |

FOREIGN PATENT DOCUMENTS 657598  2/1963  Canada ................................ 423/247

OTHER PUBLICATIONS

Brown et al., "Selective Oxidation of Carbon Monoxide," Indust. Eng. Chem, vol. 52, No. 10, pp. 841(4), Oct. 1960.

*Primary Examiner*—Timothy M. McMahon

[57] ABSTRACT

The concentration of carbon monoxide in a gaseous medium is reduced by selective catalytic oxidation in the presence of gaseous oxygen by passing the gaseous medium through a catalyst capable of oxidizing carbon monoxide in an exothermic reaction at temperatures within a given temperature range and by controlling the temperatures encountered in the catalyst in such a manner that the exothermic reaction takes place first above a threshold temperature below which the catalyst would be rapidly inactivated at the relatively high carbon monoxide concentrations present in the gaseous medium as it enters the catalyst, and subsequently, after the carbon monoxide concentration has been reduced to an acceptable level, at less than the threshold temperature to further reduce the carbon monoxide concentration to a desired minimum level below that achievable at temperatures above the threshold temperature.

3 Claims, 2 Drawing Sheets

APPARATUS FOR REMOVING CARBON MONOXIDE FROM GASEOUS MEDIA

This is a division of copending application Ser. No. 07/853,663 filed on Mar. 19, 1992.

TECHNICAL FIELD

The present invention relates to the treatment of gases in general, and more particularly to a method of and an apparatus for removing carbon monoxide from gaseous media.

BACKGROUND ART

There are already known various methods of and apparatus constructions for removing carbon monoxide from gaseous media, among them such capable of removing carbon monoxide by oxidation in the presence of gaseous oxygen from gaseous media that additionally contain other oxidizable or otherwise reactable substances, such as hydrogen, using catalysts that selectively or preferentially promote the desired conversion of carbon monoxide to carbon dioxide.

One such approach is disclosed in an article authored by M. L. Brown et al titled "Purifying Hydrogen by . . . Selective Oxidation of Carbon Monoxide", appearing in Volume 50, No. 10 of Industrial and Engineering Chemistry, pp. 841–844 (1960). As discussed there in the context of ammonia synthesis, certain catalysts, such as alumina-supported platinum, are capable of selectively promoting the oxidizing reaction of carbon monoxide to carbon dioxide with only small or negligible losses of hydrogen contained in the gaseous medium being treated to water formation, which is not bothersome and may even be desirable in this context, so long as the temperature at which the reaction takes place is above a threshold temperature. However, it is also disclosed in this article that there is a relatively high limiting value below which the carbon monoxide concentration cannot be reduced when the oxidation reaction is conducted at such relatively high temperatures in a single stage. This limitation is primarily if not exclusively attributable to a reverse shift reaction in which carbon dioxide reacts with hydrogen to form carbon monoxide and water. On the other hand, this article also mentions that, when it was attempted to conduct the selective oxidation reaction on the incoming gaseous medium, which has a relatively high carbon monoxide concentration, at temperatures below the threshold temperature, the catalyst very rapidly became ineffective and did not become effective again merely as a result of a subsequent raising of the reaction temperature to above the threshold temperature; rather, it was necessary first to purge the catalyst using a gaseous medium substantially devoid of carbon monoxide at temperatures above the threshold temperature, followed by conducting the selective oxidation reaction at such elevated temperatures. Thus, this article indicates that it is impossible or at least not feasible to treat the incoming gaseous medium at temperatures below the threshold temperature.

However, even in the above context, it is often desirable to reduce the carbon monoxide concentration to below the limiting value before the gaseous medium is supplied to the ammonia synthesis equipment proper. To this end, the above article proposes to use two consecutive selective carbon monoxide oxidation stages, with a carbon dioxide removal apparatus being interposed between such consecutive oxidation stages. Even here, however, the selective oxidation reaction is conducted at above the threshold temperature in both of the oxidation stages; yet, because of the removal of the carbon dioxide from the gaseous medium between the two oxidation stages and the resulting dearth of carbon dioxide that could participate in the aforementioned reverse shift reaction from the gaseous medium entering the second oxidation stage, the severity of such reaction in the second oxidation stage is drastically reduced, resulting in a carbon monoxide concentration in the gaseous medium leaving the second oxidation stage that is considerably below that achievable in the first oxidation stage or, for that matter, in a single-stage oxidation device.

Even the latter approach, however, leaves much to be desired. For one, the need for providing the carbon removal device between the two selective oxidation stages not only increases the complexity of the gaseous medium treatment equipment, but also significantly adds to its cost. Moreover, and possibly more importantly, there is still a limit, albeit lower than in the single-stage approach, below which the carbon monoxide concentration cannot be reduced when using the two-stage approach. Yet, there are applications, such as in treating a gaseous fuel to be supplied to a fuel cell, where even such a reduced carbon monoxide concentration is undesirably high.

Accordingly, it is a general object of the present invention to avoid the disadvantages of the prior art.

More particularly, it is an object of the present invention to provide a method of selectively removing carbon monoxide from a gaseous medium by oxidation, which method does not possess the disadvantages of the known methods of this kind.

Still another object of the present invention is so to develop the selective oxidation method of the type here under consideration as to achieve reduction of the carbon monoxide concentration in the gaseous medium to a minimum.

It is yet another object of the present invention to devise a selective carbon monoxide removal apparatus particularly suited for performing the method of the above type.

A concomitant object of the present invention is to design the apparatus of the above type in such a manner as to be relatively simple in construction, inexpensive to manufacture, easy to use, and yet reliable in operation.

A yet further object of the present invention is to present a method and apparatus of the above type which avoid the otherwise existing need for removing carbon monoxide from the gaseous medium in order to be able to reduce the carbon monoxide concentration to below a level achievable in the absence of such removal.

DISCLOSURE OF THE INVENTION

In keeping with these objects and others which will become apparent hereafter, one feature of the present invention resides in a method of reducing to a desired minimum level the concentration of carbon monoxide in a gaseous medium that also contains at least hydrogen. Such reduction is accomplished by selective catalytic oxidation in the presence of gaseous oxygen using a catalyst which is capable of oxidizing carbon monoxide in an exothermic reaction at temperatures within a given temperature range, but is rapidly inactivated when exposed to high carbon monoxide concentrations at less than a threshold temperature within the given temperature range, and incapable of reducing the carbon monoxide concentration to the minimum level when exposed to carbon monoxide at above the threshold temperature. This method includes confining a quantity of the catalyst, passing the gaseous medium through the confined catalyst quantity from an inlet portion to an outlet portion thereof, and introducing gaseous oxygen into at least the inlet portion of the confined catalyst quantity. According to the present invention, the temperatures encountered in the confined catalyst quantity are controlled in such a manner that the exothermic reaction takes place at above, and at below, the threshold temperature in the inlet portion and the outlet portion, respectively.

BRIEF DESCRIPTION OF THE DRAWING

The present invention will be described in more detail below with reference to the accompanying drawing in which.

BEST MODE FOR CARRYING OUT THE INVENTION

Figure 1:
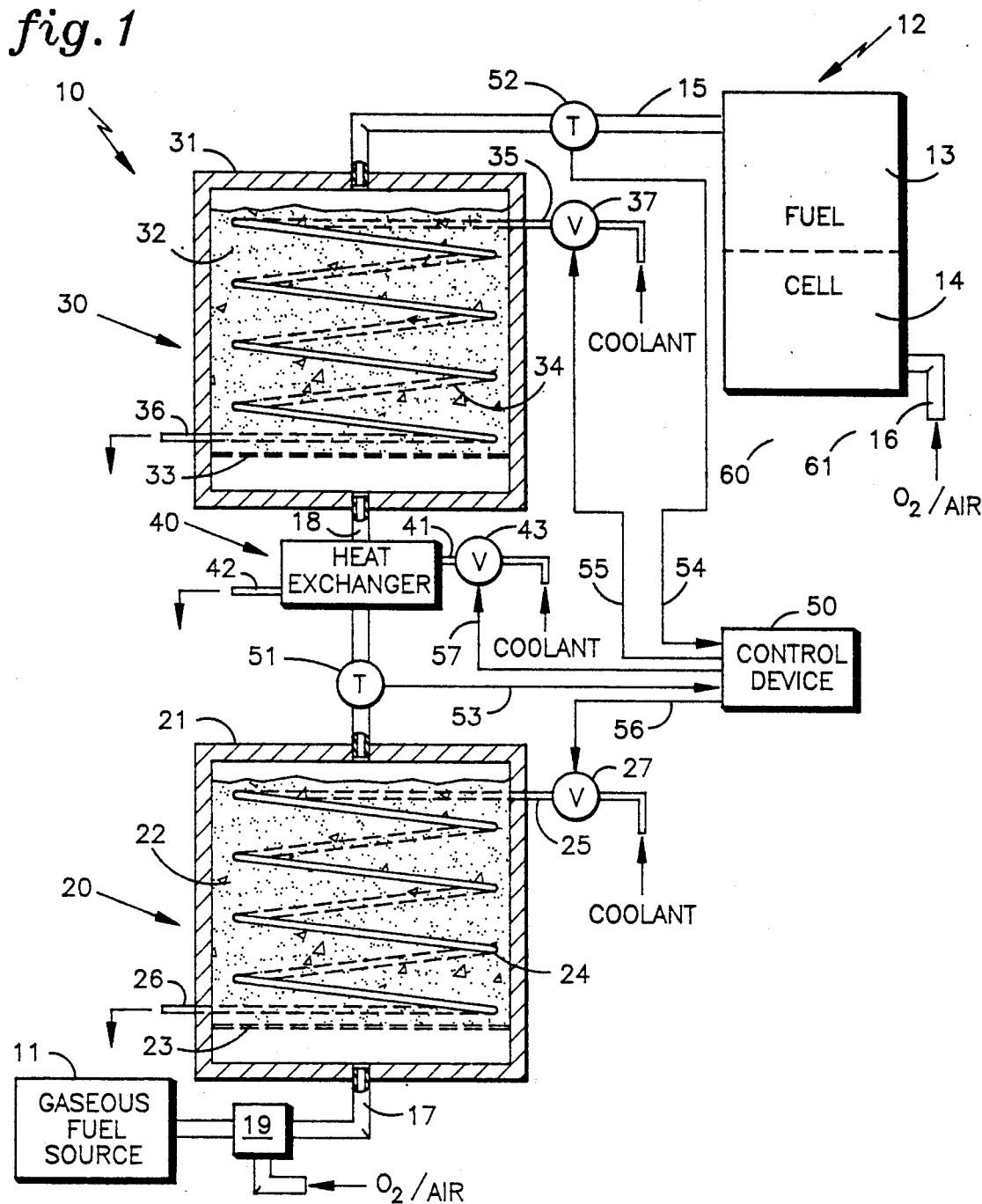
FIG. 1 is a somewhat simplified side elevational view, partly in cross section and partly in block diagram form, of a selective oxidizing apparatus constructed in accordance with the present invention as used for treating gaseous fuel for a fuel cell device.

Referring now to the drawing in detail, and first to FIG. 1 thereof, it may be seen that the reference numeral 10 has been used therein to identify a selective carbon monoxide removal apparatus constructed in accordance with the present invention. As illustrated, the apparatus 10 is to be used for reducing to a minimum level the concentration of carbon monoxide in a gaseous fuel which is to be supplied from a gaseous fuel source 11 to a fuel cell device 12. While the fuel cell device 12 has been illustrated, for the sake of simplicity, as being constituted by a single fuel cell having an anode side 13 and a cathode side 14, it is to be understood that the fuel cell device 12 can and, as is well known, usually does, contain a multitude of such individual fuel cells arranged in groups, stacks and similar assemblies. Even in this instance, however, the fuel cell device 12 has the anode side 13 to which the treated gaseous fuel is fed through a fuel supply conduit 15, and the cathode side 14 to which a gaseous oxidant, such as oxygen or air, is admitted or supplied through an oxidant supply conduit 16.

The general principles of construction and operation of the fuel cell device 12 are so well known as not to require detailed explanation herein. Suffice it to say that a catalytic electrochemical reaction takes place in the fuel cell device 12, resulting in combination of hydrogen with oxygen into product water, and in generation of a useful output, that is, electric current.

Now, as alluded to before, the electrochemical reaction requires for its performance the presence of at least one catalyst, typically a carbon-supported platinum or platinum alloy, in the fuel cell device 12. Catalysts of this kind are known to have a pronounced affinity for carbon monoxide, with the deleterious effect that any carbon monoxide carried to the anode side 13 of the fuel cell device with the gaseous medium or fuel (hydrogen) admitted through the fuel supply conduit 15 will "poison" the anode catalyst or a portion thereof, that is, render it ineffective for promoting the desired electrochemical reaction by attaching itself to the catalyst and thus denying the hydrogen access thereto. The extent of such anode catalyst poisoning determined in part by the concentration (or partial pressure) of carbon monoxide present in the gaseous fuel.

Obviously, this problem does not exist when pure, or substantially pure, hydrogen is being used as the fuel. However, such pure hydrogen is rather expensive and difficult to handle and deliver, so that a search is on in the fuel cell field for ways to utilize alternative fuels, such as methane, natural gas, or other hydrocarbon fuels. Yet, such alternative fuels cannot be used in the fuel cell devices as such; rather, they or their components have to be converted into simpler components, especially hydrogen to be used as the fuel cell fuel, and other components, such as carbon dioxide, which do not deleteriously affect the fuel cell operation or can be easily be removed from the gaseous fuel. Such conversion usually takes place, in accordance with well known principles, in a steam reformer and a shift converter together constituting the gaseous fuel source 11. Unfortunately, experience has shown that it is not possible to achieve complete conversion of the carbon contained in the incoming fuel to carbon dioxide, which means that the gaseous fuel leaving the gaseous fuel source 11 through a discharge conduit 17 contains a relatively high percentage, such as 1%, or 10,000 parts per million (ppm), of carbon monoxide.

As mentioned before, the catalyst present at the anode side 13 of the fuel cell device 12 cannot tolerate carbon monoxide without suffering loss or effectiveness or other damage. Obviously, the speed of deterioration would be extremely high if the gaseous medium exiting the gaseous fuel source 11 were supplied directly to the anode side 13. Therefore, it is crucial to provide for removal of as much of the carbon monoxide from such gaseous medium as possible to assure that the fuel cell device 12 will remain operational over a reasonable lifespan, such as at least 40,000 hours of operation. Ideally, the gaseous medium or fuel would be rid of all carbon monoxide before being admitted to the anode side 13 of the fuel cell device 12, but that is impossible to achieve, at least with the current state of technology. This being so, and considering the fact that the poisoning action of the carbon monoxide on the anode side catalyst is cumulative over the operational life of the fuel cell device 12, it is important to reduce the carbon monoxide concentration in the gaseous fuel supplied to the anode side 13 to a minimum.

To this end, the selective oxidation apparatus 10 of the present invention as illustrated includes two consecutive stages 20 and 30, with the first stage 20 being supplied with the gaseous fuel emerging from the gaseous fuel source 11 through the discharge conduit 17. A heat exchanger 40 is shown to be interposed between the stages 20 and 30, in a connecting conduit 18 extending between such stages 20 and 30 and carrying gaseous fuel discharged from the first stage 20 to the second stage 30. Each of the stages 20 and 30 includes an enclosed vessel or container 21 or 31 which bounds an internal chamber. A respective body or bed 22 or 32 of a catalyst capable of selectively oxidizing carbon monoxide in the presence of gaseous oxygen is contained in the internal chamber of the respective container 21 or 31, being shown to be supported on a perforated or otherwise gas-permeable support member 23 or 33 which facilitates the distribution of the gaseous fuel to all regions of the respective catalyst bed 22 or 32 and makes it as uniform as possible. The catalyst contained in the beds 22 and 32 is of the type known to be highly selective for carbon monoxide. Examples of such catalysts are listed in the article mentioned above. Currently, it is preferred to use alumina supported platinum, by itself or in combination with other trace elements, for the selective catalyst of the catalyst beds 22 and 32.

Gaseous oxygen, the presence of which is needed for the performance of the selective oxidizing reaction in the two catalyst beds 22 and 32, is indicated to be admixed, either as such or as a component of air or a similar oxygen-carrying gas, to the gaseous fuel flowing in the conduit 17, in a mixing device 19. However, it is to be understood that such oxygen or oxygen-carrying gas could be introduced instead directly into the container 21 and/or 31 either only upstream of the catalyst bed 22 and/or 32 or additionally into the bed 22 and/or 32-itself.

A cooling coil 24 or 34 is shown to be embedded in the respective catalyst bed 22 or 32, being supplied with a coolant through a respective coolant supply conduit 25 or 35, with the coolant being discharged from the respective cooling coil 24 and 34 after passing therethrough via a respective spent coolant discharge conduit 26 or 36. The rate of flow of the fresh coolant into the respective cooling coil 24 or 34 is controlled by a respective coolant flow control valve 27 and 37. Similarly, a coolant is admitted into the heat exchanger 40, which is of any well-known construction, through a coolant supply conduit 41, and is discharged therefrom through a discharge conduit 42, with the rate of flow of the coolant through the heat exchanger 40 being controlled by a flow control valve 43.

The operation of the selective oxidizing apparatus 10 and particularly of the valves 27, 37 and 43 is controlled by a control device 50 which again is of any known construction and usually includes a computer or a part of a computer that controls the operation of the fuel cell 12 and/or the gaseous fuel source 11, and appropriate software. The control device 50 is intended to control the valves 27, 37 and 43 in such a manner that the selective oxidizing process, which is exothermic by nature, takes place in the respective catalyst beds 22 and 32 under well defined temperature conditions that will be explained later. To be able to do this, the control device 50 is furnished with information from respective temperature measuring devices 51 and 52, through respective connecting lines 53 and 54, about the temperatures of the gaseous fuel after it has left the first stage 20 and the second stage 30, respectively, of the selective oxidizing apparatus 10. Based on this information, the control device 50 then issues control commands that are furnished to the respective valves 27, 37 and 43 through respective control lines 55, 56 and 57 to thereby control the rate of flow of the coolant through the respective valves 27, 37 and 43 in the senses resulting in the temperatures sensed by the temperature measuring devices 51 and 52 approaching or reaching the desired values.

Control algorithms capable of accomplishing this purpose are of the well known type so that they need not be described in detail here. Suffice it to say that, in accordance with the present invention, the cooling of, that is the removal of the exothermic oxidizing reaction heat from, the first stage catalyst bed 22 is controlled via the valve 27 in such a manner that the temperatures existing in the first catalyst bed 22 are consistently above a threshold temperature below which the catalyst would be rapidly rendered ineffective when exposed to the high concentration of carbon monoxide contained in the gaseous fuel treated as it enters the first catalyst bed 22. This threshold temperature is about 220° F. However, it has been found to be advantageous to conduct the oxidizing operation in the first catalyst bed 22 at temperatures that are considerably higher than the threshold temperature, such as at about 320° F.

As mentioned before, at these relatively high temperatures, the catalyst is not rendered ineffective by the carbon monoxide despite its high concentration; yet, as has been found out before, it is impossible for the carbon monoxide concentration to be reduced to less than about 60 ppm during its passage through the first catalyst bed 22 regardless of its size when the oxidizing operation is conducted at temperatures above the threshold temperatures throughout, without removing the product carbon dioxide from the gaseous fuel stream as proposed in the aforementioned article. Yet, quite surprisingly, it has been established that there is no need for such carbon dioxide removal when, in accordance with the present invention, the temperatures at which the selective oxidation reaction takes place in the second stage catalyst bed 32 are maintained below the threshold temperature but still within the temperature range within which the catalyst is effective to promote or achieve the selective or preferential oxidation of carbon monoxide. Moreover, and even more importantly, it has been found out that, when this expedient is resorted to, the carbon monoxide concentration in the gaseous fuel as it leaves the second catalyst bed 32 is reduced to a significantly lower level than that achievable by using the approach disclosed in the above article, such as to 6 ppm or even less.

In view of this, the control device 50 is made operative for maintaining the temperatures throughout the second catalyst bed 32 below such threshold temperature. This is achieved, in the illustrated apparatus 10, by cooling the gaseous fuel in the heat exchanger 40 to below the threshold temperature prior to its admission into the second stage 30 and, furthermore, by cooling the second catalyst bed 32 by a coolant flowing through the cooling coil 34 under the control of the valve 37 to remove additional heat resulting from the exothermic oxidation reaction from the second catalyst bed 32. It came as quite a surprise that, despite the propensity of the catalyst for being rendered ineffective by the carbon monoxide at temperatures below the threshold value, this did not occur in the second catalyst bed 32. A possible explanation for this rather unexpected result is that the concentration of the carbon monoxide in the gaseous fuel entering the second catalyst bed 32 is already so low, after the bulk of the carbon monoxide has been removed in the first catalyst bed 22, that the remaining carbon monoxide is incapable of rendering the catalyst of the second bed 32 ineffective, at least at any other than a negligible rate.

Even though the construction of the selective oxidation apparatus described above is considered to be particularly advantageous, it is also contemplated by the present invention to conduct the above two-stage selective oxidizing operation without intervening cooling of the gaseous medium between the stages 20 and 30. As a matter of fact, it is also proposed to for the two-stage oxidation process to be performed in a single bed, in which case the function of the first catalyst bed 22 would be performed by an inlet portion of the single catalyst bed at temperatures above the threshold temperature, and that of the second catalyst bed 32 by an outlet portion of such single catalyst bed at temperatures below the threshold temperature. In this scenario, there could be either an abrupt temperature drop between the inlet and outlet portions, or a gradual temperature decrease from above to below the threshold temperature in the direction of flow of the gaseous medium through the single catalyst bed.

Furthermore, even though the selective carbon monoxide oxidation apparatus 10 has been shown as having the catalyst located outside the respective coils 24 and 34 in the form of respective beds 32 and 34, it is to be understood that the situation can be reversed if found advantageous, that is, the required catalyst quantity could be accommodated inside the coils 24 and 34 as either inlet and outlet portions of such quantity or continuous catalyst bed, or as respective separate catalyst beds, and the cooling medium could then be situated as respective cooling medium baths all around the convolutions of the coils 24 and 34. Under these circumstances, the conduits 25, 35, 26 and 36 would obviously communicate with the respective cooling medium baths, and the valves 27 and 37 would be used to control the admission of fresh (cool) cooling medium into the respective baths so as to control the desired temperatures thereof. This approach, however, does not readily lend itself to the achievement of gradual temperature diminution in the catalyst quantity in the direction from its inlet portion to its outlet portion.

Figure 2:
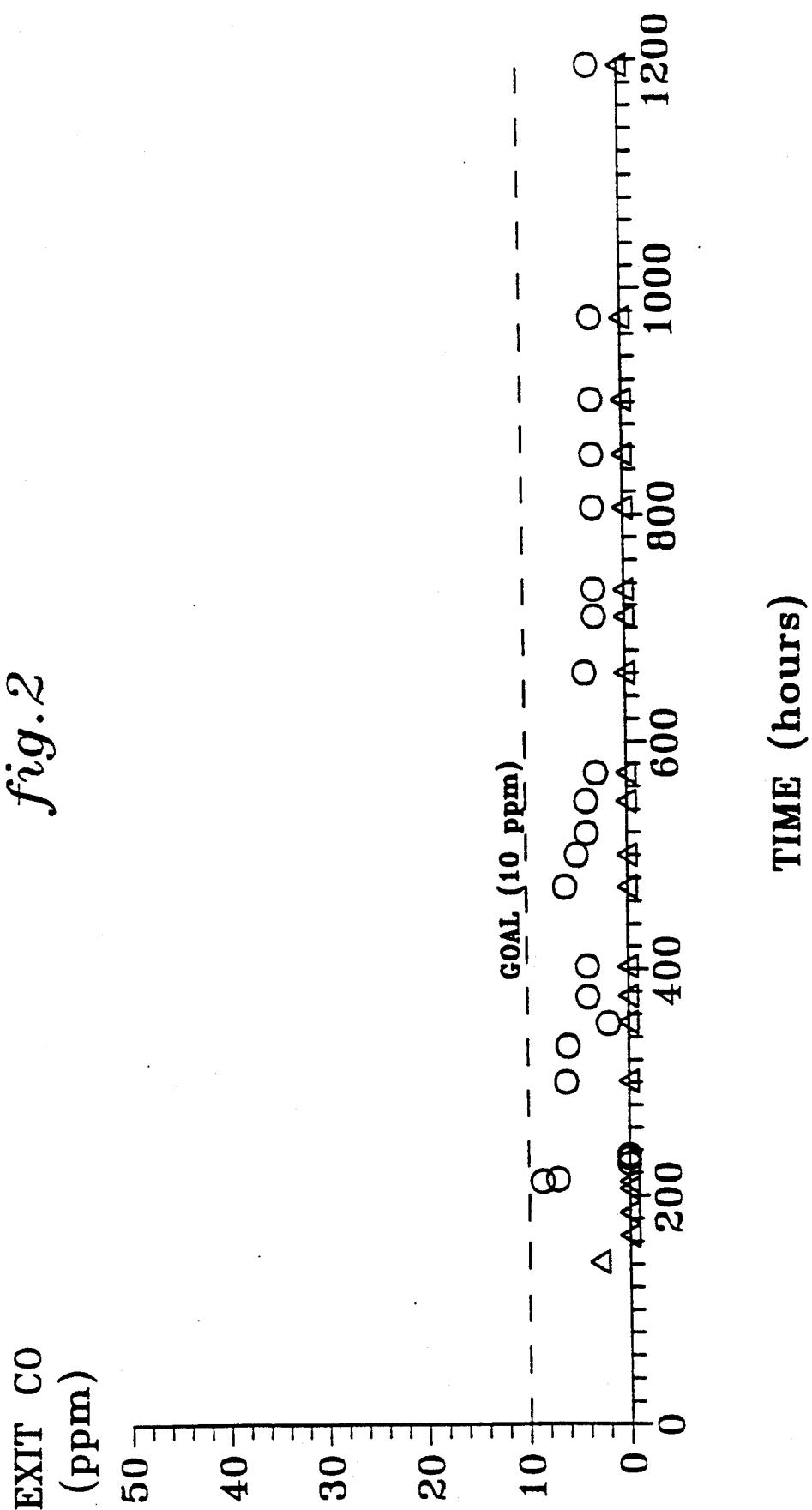
FIG. 2 is a graphic representation of test results obtained by running an experimental apparatus akin to that of FIG. 1 and indicating the significant carbon dioxide reduction achieved when performing the method of the present invention.

Turning now to FIG. 2 of the drawing, it may be seen that it shows certain test results obtained by using an experimental selective carbon monoxide oxidation apparatus employing the principles of the present invention but constructed as an implementation of the last-mentioned approach in two separate consecutive stages of which the first is maintained at above, and the second at below, the threshold temperature of 220° F., at a certain hourly volumetric space velocity (cubic feet per hour of the gaseous medium per cubic foot of catalyst). To achieve consistent and comparable results, a gaseous medium of a known and constant composition (by volume, 1% carbon monoxide, 29% carbon dioxide, and the remainder hydrogen) to which there was added 1.35% by volume oxygen (resulting in 2.7 times the stoichiometric ratio of oxygen to carbon monoxide) was used throughout such tests. Of the 1.35% oxygen, the 1% was added to the gaseous medium prior to the first stage, and the remaining 0.35% prior to the second stage.

It may be seen by observation of FIG. 2 that the carbon monoxide concentrations measured downstream of the second stage (indicated by circles in FIG. 2) were consistently below the desired upper limit of 10 ppm, and often below 5 ppm. There is also an apparent tendency for such concentrations to decrease with increasing time of operation of the apparatus, boding well for the operational longevity of such selective oxidizing apparatus.

Moreover, another set of carbon monoxide concentration measurements (indicated by triangles in FIG. 2) was taken within (approximately in the middle of) the second stage. The results of such measurements were consistently below those obtained at or downstream of the second stage exit (as a matter of fact, so low that it was impossible to obtain accurate indications given the limited sensitivity of the measuring device), indicating that some backshifting from carbon dioxide to carbon monoxide takes place due to reaction with hydrogen in the second stage downstream of the location at which the measurements were taken. Yet, this limited amount of carbon monoxide regeneration may be acceptable in many cases, especially since the carbon monoxide concentration in the exiting gaseous medium is still well below the desirable upper limit.

While the present invention has been illustrated and described as embodied in a particular construction of a selective oxidizing apparatus for use in carbon monoxide removal from a gaseous fuel being supplied to a fuel cell, it will be appreciated that the present invention is not limited to this particular example; rather, the scope of protection of the present invention is to be determined solely from the attached claims.

We claim:

1. An apparatus for reducing the concentration of carbon monoxide in a gaseous medium, consisting essentially of:
   a. a confined quantity of catalyst capable of oxidizing carbon monoxide forming an inlet portion and an outlet portion, wherein said catalyst has a threshold temperature below which said catalyst is inactivated when exposed to a predetermined carbon monoxide concentration;
   b. means for controlling the temperature of at said inlet portion above the threshold temperature;
   c. means for controlling the temperature of said outlet portion below said threshold temperature;
   d. means for passing the gaseous medium through said inlet portion and said outlet portion; and
   e. means for introducing gaseous oxygen to said inlet portion.

2. An apparatus as in claim 1 wherein said means for controlling the temperature of said inlet portion is capable of maintaining a temperature up to about 320° F.

3. An apparatus as in claim 1, wherein said means for controlling said temperature in said inlet portion and said means for controlling said temperature in said outlet portion comprises means for cooling the gaseous medium after leaving said inlet portion and before entering said outlet portion.

* * * * *